UNITED STATES PATENT OFFICE.

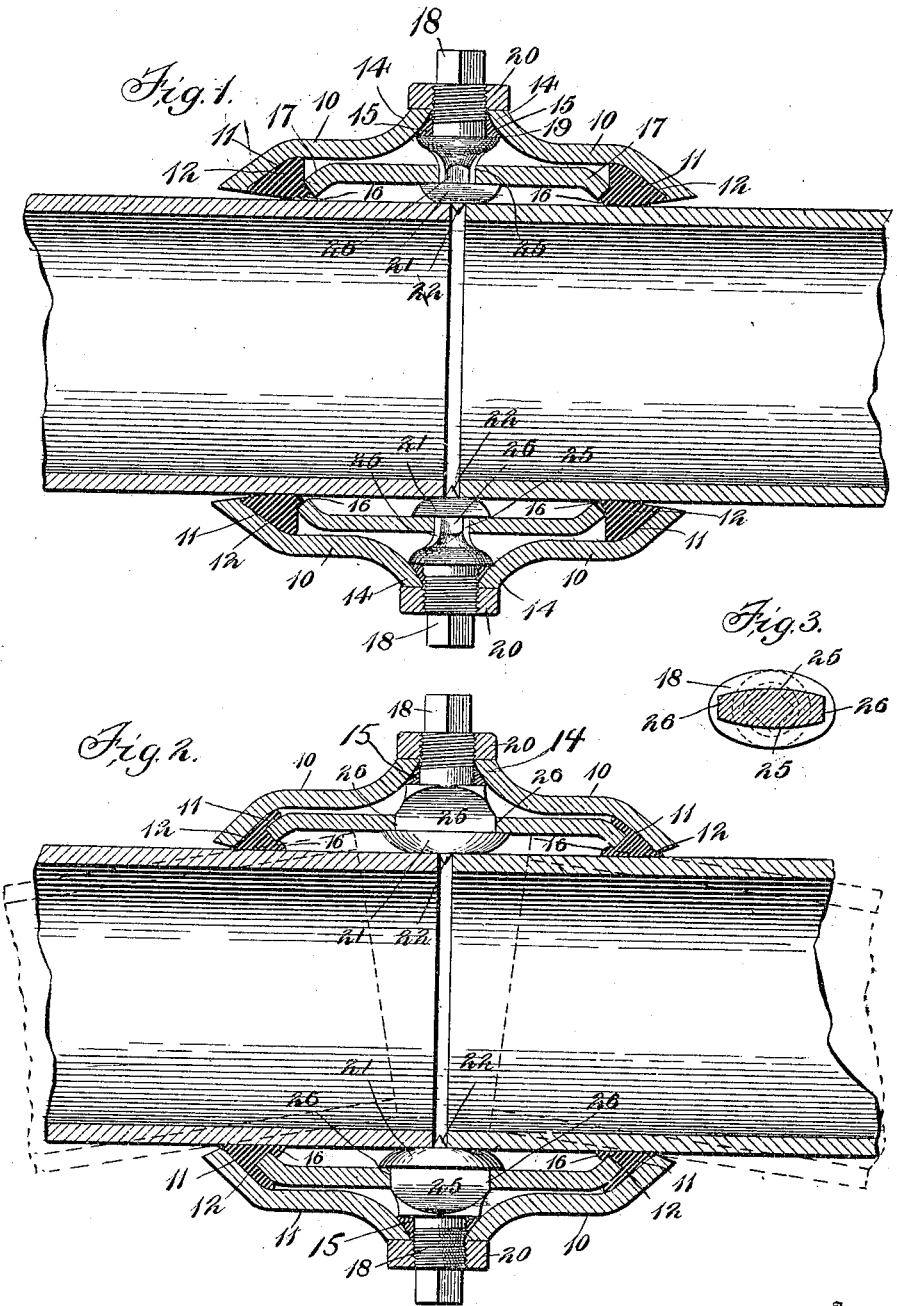

ANDREW WALTER GRAHAM, OF BRADFORD, PENNSYLVANIA.

PIPE-COUPLING.

No. 839,750.  Specification of Letters Patent.  Patented Dec. 25, 1906.

Application filed October 3, 1905. Serial No. 281,180.

*To all whom it may concern:*

Be it known that I, ANDREW WALTER GRAHAM, a citizen of the United States, residing at Bradford, in the county of McKean and State of Pennsylvania, have invented new and useful Improvements in Pipe-Couplings, of which the following is a specification.

This invention relates to pipe-couplings, and has for its principal object to provide a novel form of packed coupling of simple and economical construction.

A further object of the invention is to provide a coupling in which a fluid-proof packing may be inserted and placed under pressure in such manner as to positively prevent leakage, the packing being wholly internal and protected from exposure.

A still further object of the invention is to provide a coupling having packing arranged at both ends and to employ internal packing compression members so arranged as to exert equal force on both packing members.

A still further object of the invention is to provide a packed coupling in which the pipe-sections may be turned out of alinement with each other without impairing the coupling.

With these and other objects in view the invention consists in the novel construction and arrangement of parts hereinafter described, illustrated in the accompanying drawings, and particularly pointed out in the appeneded claims, it being understood that various changes in the form, proportions, and details of the structure may be made without departing from the invention.

In the accompanying drawings, Figure 1 is a sectional view of a pipe-coupling constructed in accordance with the invention, showing the position of the parts before the spreading of the compression-rings. Fig. 2 is a similar view, the parts being shown in operative position. Fig. 3 is a detail sectional view of one of the compression-ring-actuating cams.

Similar numerals of reference are employed to indicate corresponding parts throughout the several figures of the drawings.

The main sleeve 10 is formed of wrought or other iron, the ends of the sleeve being arranged on convergent lines to form angular or wedge surfaces 11, against which the packing-rings 12 rest. At the center of the sleeve the metal is bent outward at two or more points in accordance with the diameter of the coupling, forming flanged openings 14. The flanges are tapered for the reception of packing-rings 15, which act to prevent the escape of fluid through the openings.

The packing-rings 12 are approximately triangular in cross-section and at their inner edges have beads or flanges 16 to receive the inbent ends of compression-rings 17. These rings are of such diameter as to slide freely between the main sleeve and the pipe-sections, their internal diameter, however, being sufficient to permit flexing of the pipe-line, as shown by dotted lines in Fig. 2.

In practice, and more particularly in couplings of small size, the compression-rings are inserted in the outer or main sleeve, and then one or both ends of the latter are flanged or bent inward to prevent the withdrawal of the rings, and thus save time in placing the coupling in position.

In order to spread the compression-rings, two or more cam-bolts 18 are employed. Each bolt is provided with an annular flange 19 to bear against the packing-ring 15, and its outer end is threaded for the reception of a nut 20, by which the packing-ring 15 is compressed and the cam-bolt locked from revoluble movement. The extreme outer end of the bolt is square or hexagonate for engagement by a wrench or similar tool.

The inner end of the bolt is provided with an enlarged head 21, having a pipe-centering teat 22, against which the ends of the pipe-sections may abut to properly position the coupling. Between this head and the flange 19 the bolt is approximately elliptical in cross-section, forming a double cam, which acts on the compression-rings.

In assembling the parts the packing-rings are introduced at the ends of the sleeve, and the cam-bolts are passed through the flanged openings 14, being introduced between the compression-rings. The pipe-sections are then inserted, after which the nuts 20 are loosely turned on the threaded ends of the cam-bolts. The cam-bolts are then turned, and the compression-rings are spread apart, the outturned ends of the rings embedding themselves in the packing-rings, compressing the latter and forcing them tightly into the inclined space between the ends of the coupling-sleeve and the pipes. In order to permit this operation without excessive strain, the cam-faces 25 are made gradual, and at the ends of the cams are straight faces 26, parallel with each other and so disposed that the rings will abut firmly thereagainst and prevent accidental turning of the cam-bolts to release position.

The nuts 20 are then turned tightly in place, compressing the packing-rings 15 and at the same time locking the cam-bolts.

A coupling made in accordance with this invention is cheap, easily placed in position, and is fluid-proof under high pressures, the packing-rings being so arranged that the pressure of the fluid will assist in holding the packing in place. The pipe-sections, moreover, may be turned to varying angular positions without injury to the packing, as will be evident on reference to Fig. 2.

Having thus described the invention, what is claimed is—

1. A coupling including a sleeve having inturned end portions, internal packing-rings fitting therein, oppositely-movable packing compression-rings within the sleeve, and means for spreading said rings.

2. A coupling including a sleeve having inturned end portions, internal packing-rings fitting therein, oppositely movable packing compression members within the sleeve, and means extending through the wall of the sleeve for spreading said members.

3. A coupling comprising a sleeve having inturned end portions, internal packing-rings fitting therein, compression-rings arranged within the sleeve and having inturned end portions for engagement with the packing-rings, and cams for spreading said compression-rings.

4. A coupling comprising a sleeve having inturned end portions, packing-rings fitting therein, and a packing compression means adjustable from the exterior of the sleeve and independent of the pipe-sections for exerting equal pressure on both.

5. A coupling comprising a sleeve having inturned end portions, packing-rings arranged therein, packing compression-rings, and a cam-bolt for spreading said rings.

6. A coupling comprising a sleeve having inturned end portions, packing-rings arranged therein, packing compression-rings disposed in the sleeve, adjustable bolts disposed between the compression-rings and having cam-faces for spreading said rings, and means for locking said cam-bolts in position.

7. A coupling comprising a sleeve having inturned end portions, packing-rings arranged therein, packing compression-rings disposed in the sleeve, cam-bolts disposed between the compression-rings and having threaded end portions extending through openings in the sleeve, and locking-nuts arranged on the threaded ends of said cam-bolts.

8. A coupling comprising a sleeve having inturned end portions, packing-rings arranged therein, packing compression-rings disposed in the sleeve, said sleeve being further provided with flanged openings in its peripheral wall, cam-bolts disposed between the compression-rings and having flanges intermediate their ends, packing-rings arranged around said bolts, and nuts mounted on said bolts for compressing the bolt packing-rings.

ANDREW WALTER GRAHAM.

Witnesses:
WILFRED E. LAWSON,
ALBERT POPKINS.